United States Patent [19]
Tippmann et al.

[11] Patent Number: 6,145,431
[45] Date of Patent: Nov. 14, 2000

[54] STEAM HEATED GRIDDLE AND GRILL AND THE METHOD OF COOKING WITH SAME

[76] Inventors: Joseph R. Tippmann, HRC-33, Box 8419, Rapid City, S. Dak. 57701; Vincent P. Tippmann, 8605 N. River Rd., New Haven, Ind. 46774

[21] Appl. No.: 09/534,982

[22] Filed: Mar. 27, 2000

Related U.S. Application Data

[63] Continuation-in-part of application No. 08/963,248, Nov. 3, 1997, Pat. No. 6,062,129.

[51] Int. Cl.$^7$ .............................. A47J 37/00; A47J 37/06
[52] U.S. Cl. ................................. 99/330; 99/339; 99/340; 99/417; 99/422; 99/448; 99/450
[58] Field of Search .............................. 99/330, 339, 340, 99/345–347, 349, 352–355, 357, 403, 372–379, 410–417, 422, 426, 447–450, 484, 516, 517; 126/9 R, 20, 25 R, 29, 152 B, 369, 374–378, 389, 390; 165/104.21, 104.26; 219/524, 525, 386, 401

[56] References Cited

U.S. PATENT DOCUMENTS

| | | | |
|---|---|---|---|
| 4,913,039 | 4/1990 | Sutphen | 99/339 |
| 5,033,366 | 7/1991 | Sullivan | 99/352 |
| 5,086,693 | 2/1992 | Tippmann et al. | 99/333 |
| 5,189,945 | 3/1993 | Hennick | 99/339 |
| 5,201,364 | 4/1993 | Tippmann et al. | 219/386 X |
| 5,203,258 | 4/1993 | Tippmann et al. | 99/483 |
| 5,247,874 | 9/1993 | George, II et al. | 99/330 |
| 5,682,809 | 11/1997 | Harrison | 99/339 |

*Primary Examiner*—Timothy Simone
*Attorney, Agent, or Firm*—Birch, Stewart, Kolasch & Birch, LLP

[57] ABSTRACT

An apparatus for cooking foods on a conduction-heated griddle with an upper food support surface. A steam generator supplies steam at controlled temperatures. At least one cover is disposed adjacent to the support surface and is placed at a position substantially covering the foods. An orifice connects the steam generator to inside the cover and injects steam around the foods so as to aid in the cooking of the foods simultaneously with the foods being cooked by the heated griddle.

15 Claims, 15 Drawing Sheets

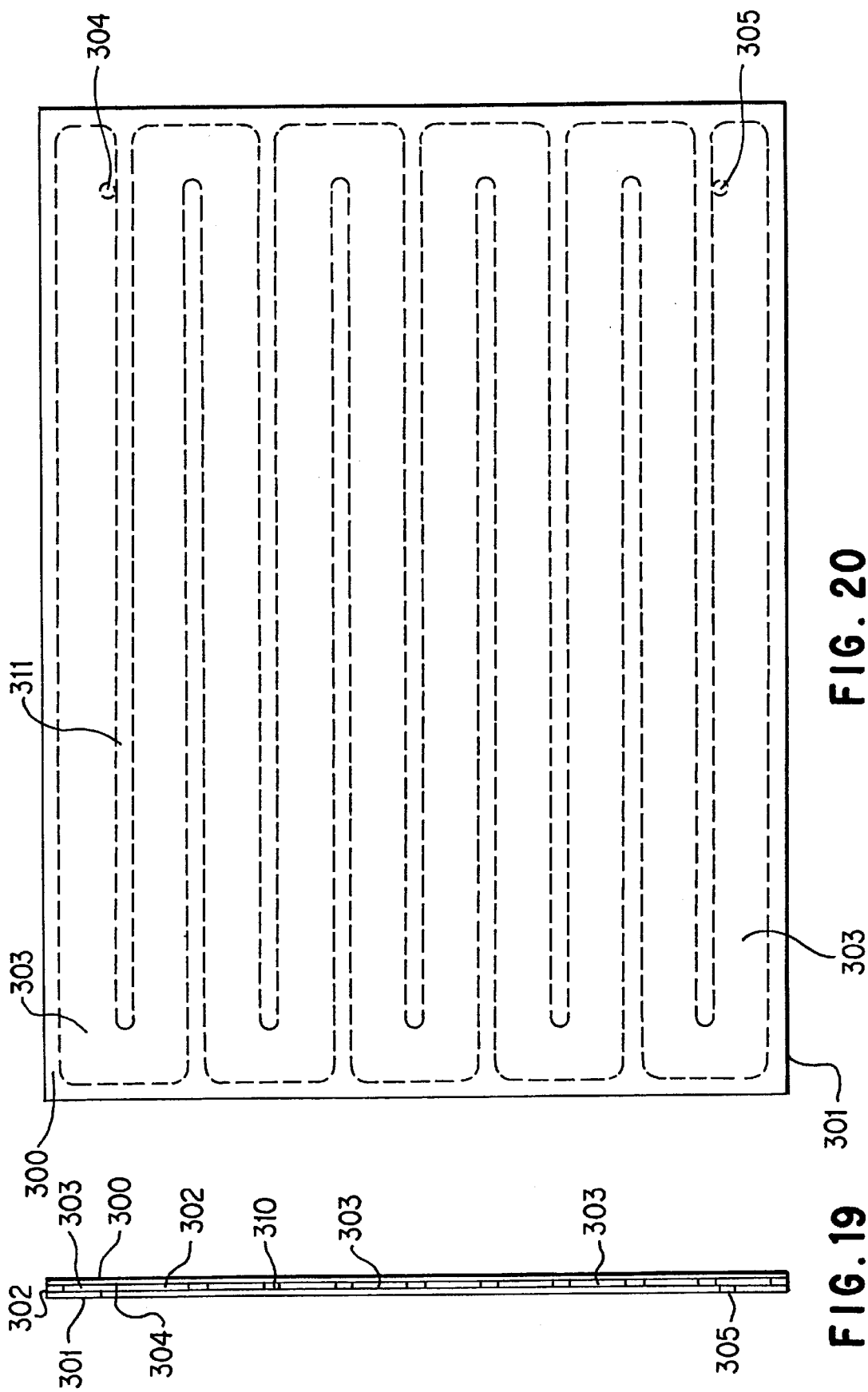

STEAM HEATED GRIDDLE AND GRILL AND THE METHOD OF COOKING WITH SAME

This application is a continuation-in-part of application Ser. No. 08/963,248, filed Nov. 3, 1997 now U.S. Pat. No. 6,062,129.

This invention relates to a griddle, a grill and a cover therefor used in cooking food items and, more preferably, to a steam heated griddle and grill and to a steam-containing cover adapted to be placed over selected food items being cooked on a griddle or grill so as to simultaneously cook the food items by steam introduced into the interior of the cover.

BACKGROUND OF THE INVENTION

The cooking of items by placing them on a grilling surface and simultaneously introducing steam into the interior of a hood covering food items being grilled is known as disclosed in U.S. Pat. No. 4,913,039. The grill disclosed in that patent is unevenly heated by either burning charcoal or lava rocks heated by an electric heating element or a gas flame, which is in contrast to the present invention where the grilling surface is evenly heated and whose temperature is accurately controlled, and, hence, the temperature of the cooking surface is accurately controlled.

SUMMARY OF THE INVENTION

Applicants have discovered that by heating griddle and grill cooking surfaces such that the temperature across the entire surfaces can be controlled within one or two degrees Fahrenheit and providing a cover over the cooking food under which steam is injected, substantial benefits can be obtained with the cooked food. This is in contrast to conventional griddles and grills that can have a temperature variation as much as 70–80° F. from one area to another area of the cooking surfaces and do not have a cover under which steam is injected. In one embodiment of the present invention, the griddle is made of aluminum, which is cast around a generally serpentine pipe for carrying steam.

The cooking surface of the griddle, because it is maintained at an even and usually low temperature can be provided with various stick resistant coatings or can be coated, e.g. plated, with metals, such as nickel, to provide a stick resistant coating. The stick resistant surface of the coating ensures that the desirable browning of the food will occur and yet the food may be easily removed from the griddle's surface. Cleaning the surface after use is achieved by wiping the surface with a cloth.

The temperature of the cooking surface is controlled with any desired temperature controller, e.g. with a conventional thermostat or a microprocessor-based, proportional controller with a thermocouple sensor. Thus, the temperature can be maintained within one degree of a set point at any ordinary food loading on the griddle. Because of the extremely accurate temperature control, no part of the griddle surface ever becomes significantly hotter than the set point and thus food products placed on the griddle produce little or no smoke and do not burn.

It has been further discovered that a grilling surface comprising a plurality of spaced-apart members, e.g. a conventionally arranged grilling surface, having a passageway(s) therethrough and using high temperature and pressure steam passing therethrough can serve to grill food items with the same efficiency as the griddle surface. A stick resistant coating, as described above, can also be applied to the members.

In addition, the present invention employs a novel steam-jet and cover system that cooks food items placed on either the griddle or grill surface in approximately one-half of the usual time and with one-half of the usual food shrinkage encountered with cooking on conventional griddles and grills. The system comprises a low-pressure boiler or steam generator connected to steam ports adjacent to the griddle or grill surface. Food products placed on the griddle or grill are disposed under a cover and steam is injected beneath the cover and around the food product. The food products are thus heated on the bottom by contact with the griddle or grill surface and on the top and sides by contact with the steam. This cooking method eliminates the evaporation of water from the cooking food and reduces the time required for cooking. Thus is in contrast to heated water, in the form of a mist, injected in proximity to the food item, since such mist, it has been found, does not achieve the same cooking results. The misted, warmed water tends to collect on top of the food item and does not transfer heat to the food item as does steam as it condenses on the item and transfers latent heat. The food cooked with the present apparatus is also more tender and juicy and has a higher weight yield than food cooked on conventional griddle or grills.

Thus, briefly stated, the present invention provides an apparatus for cooking foods. A conduction-heated griddle has an upper food support surface for supporting foods to be cooked thereon. A steam generator is provided for supplying steam at controlled temperatures. At least one cover is disposable adjacent to the support surface and adapted to be placed at or removed from a position substantially covering the foods. An orifice connected to the steam generator is provided for supplying steam to an inside of the cover and around the foods so as to aid in the cooking of the foods simultaneously with the foods being cooked by the heated griddle.

4

Figure 8:
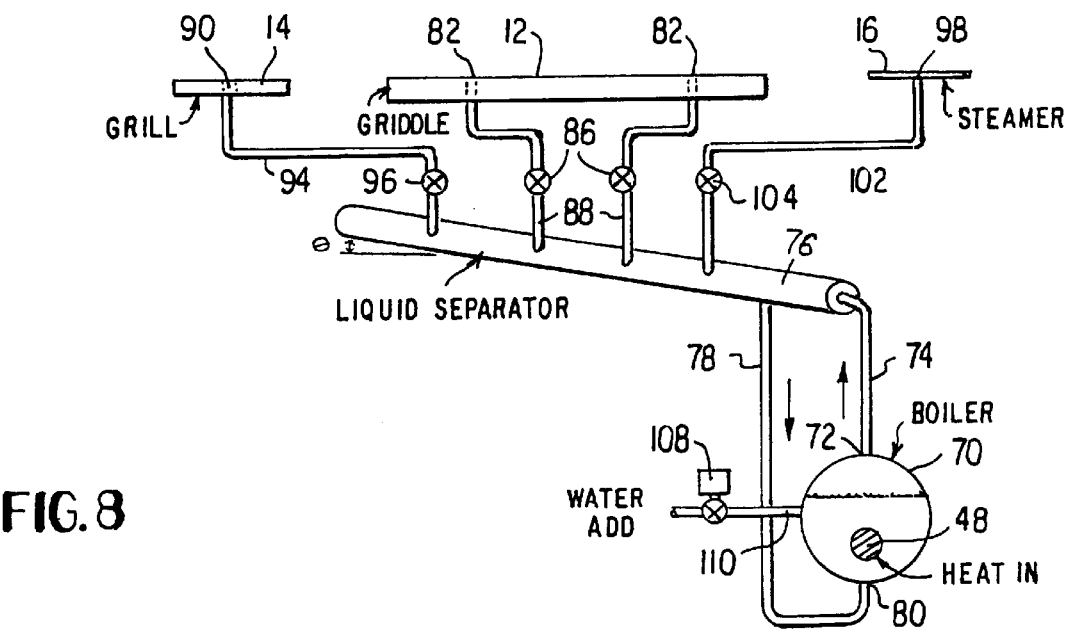
Figure 9:
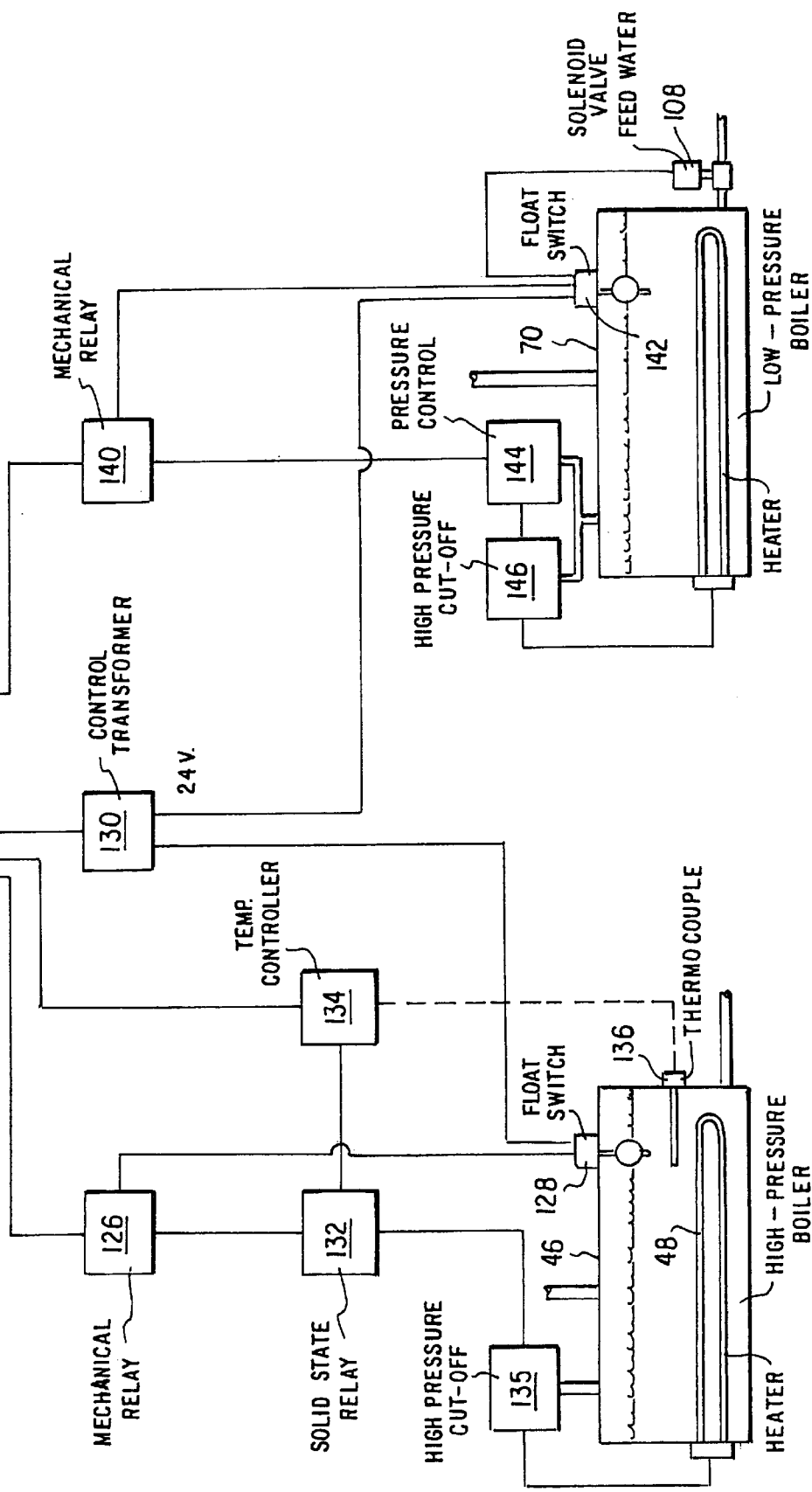
Figure 10:
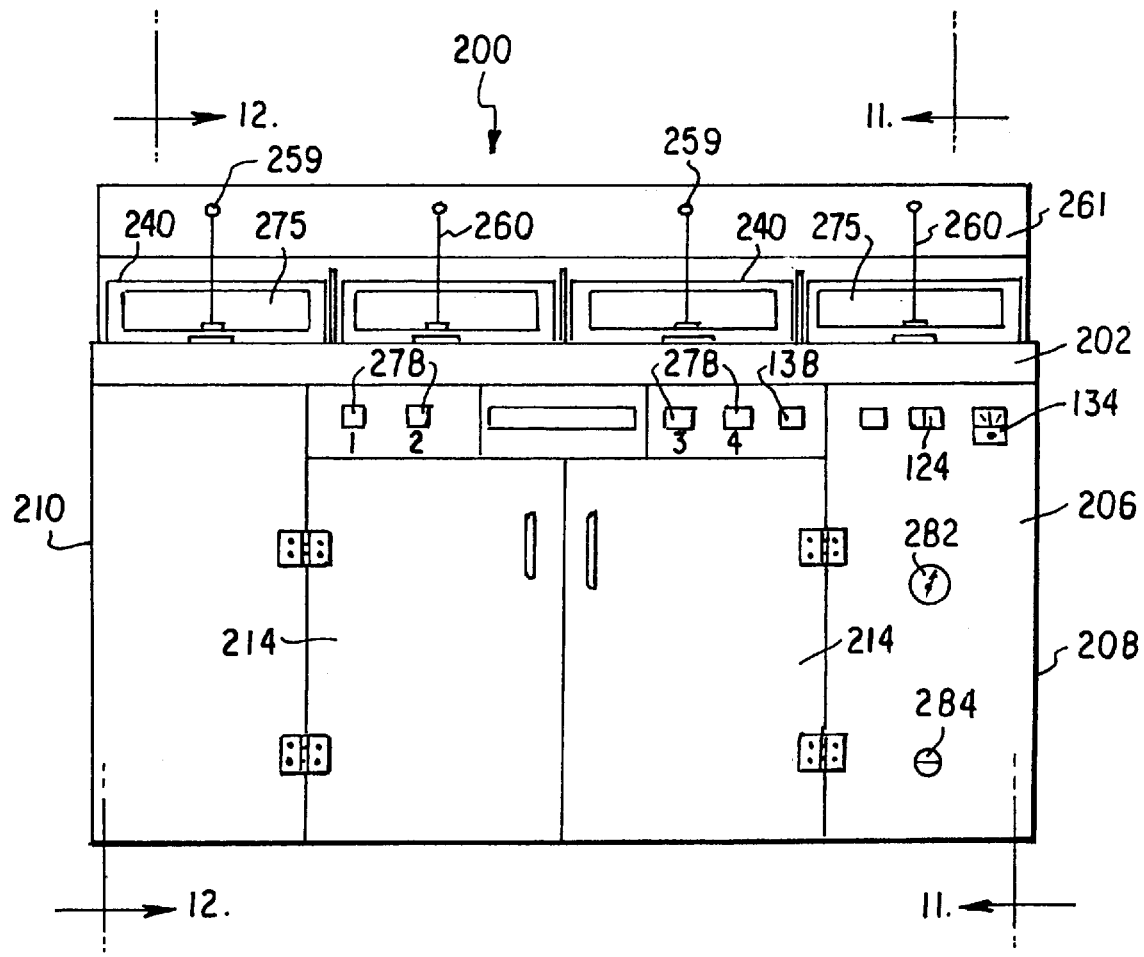
Figure 11:
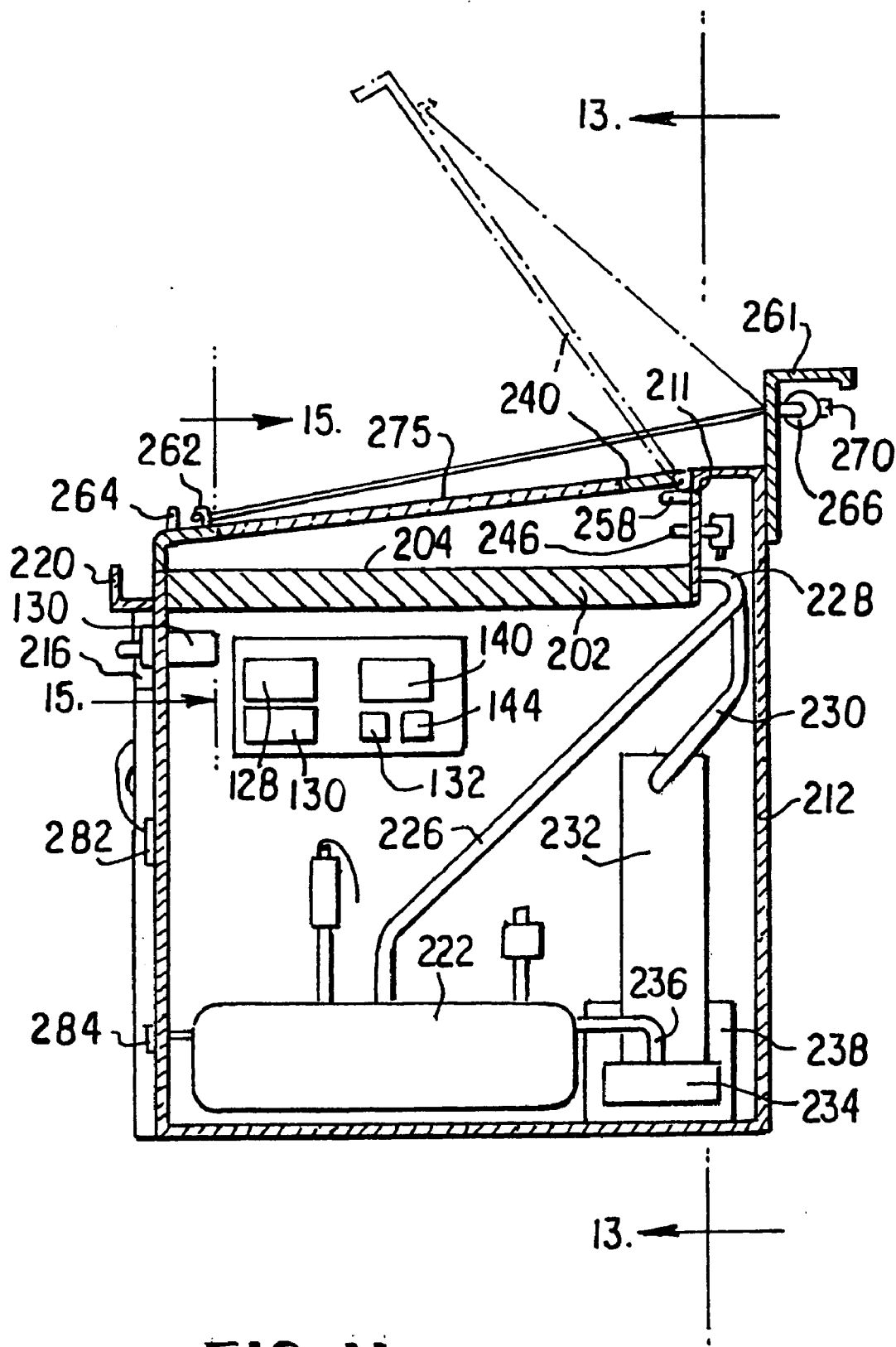
Figure 12:
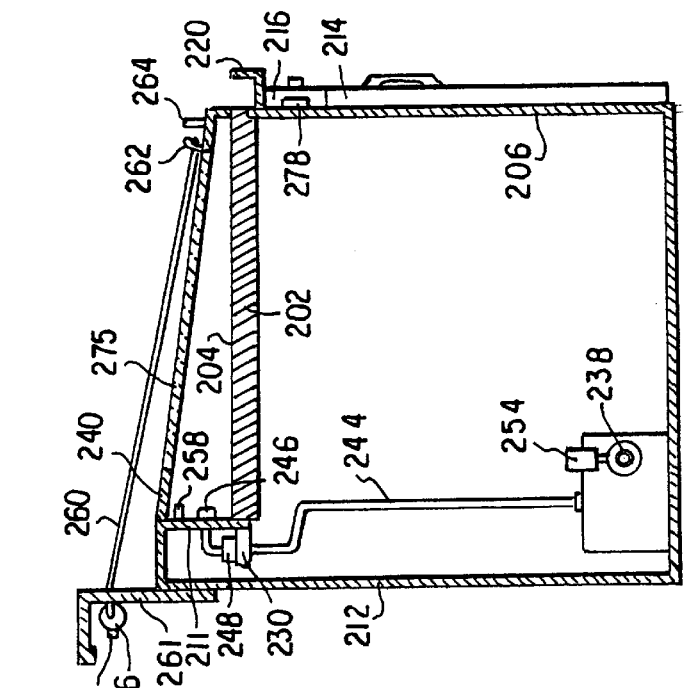
Figure 13:
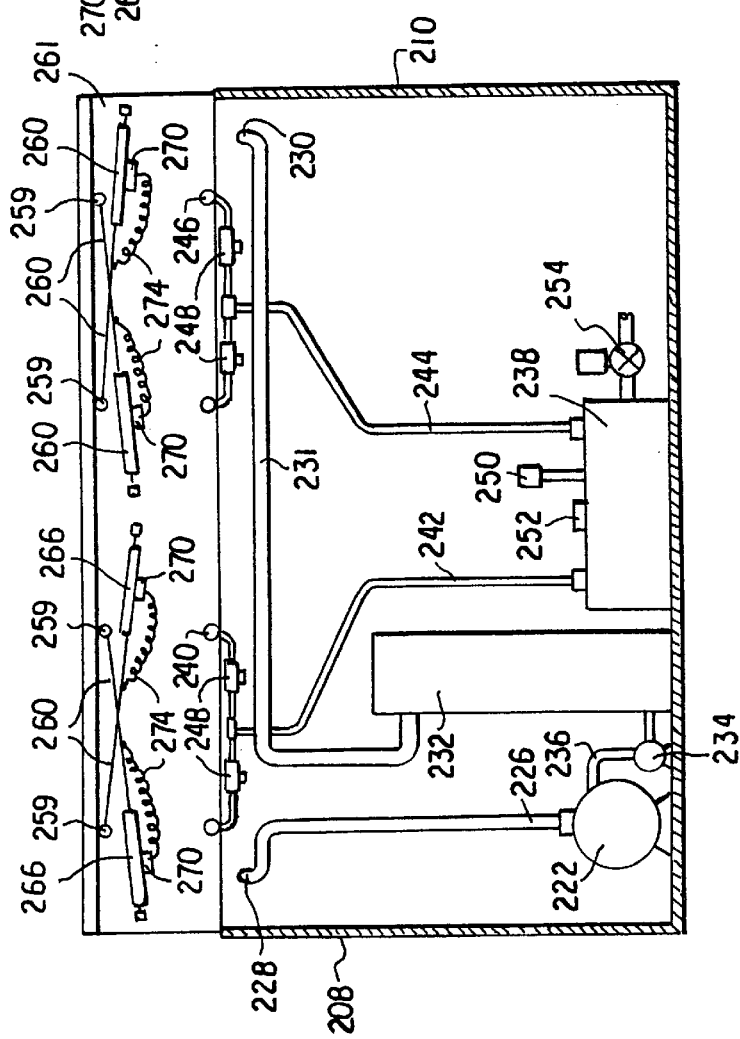
Figure 14:
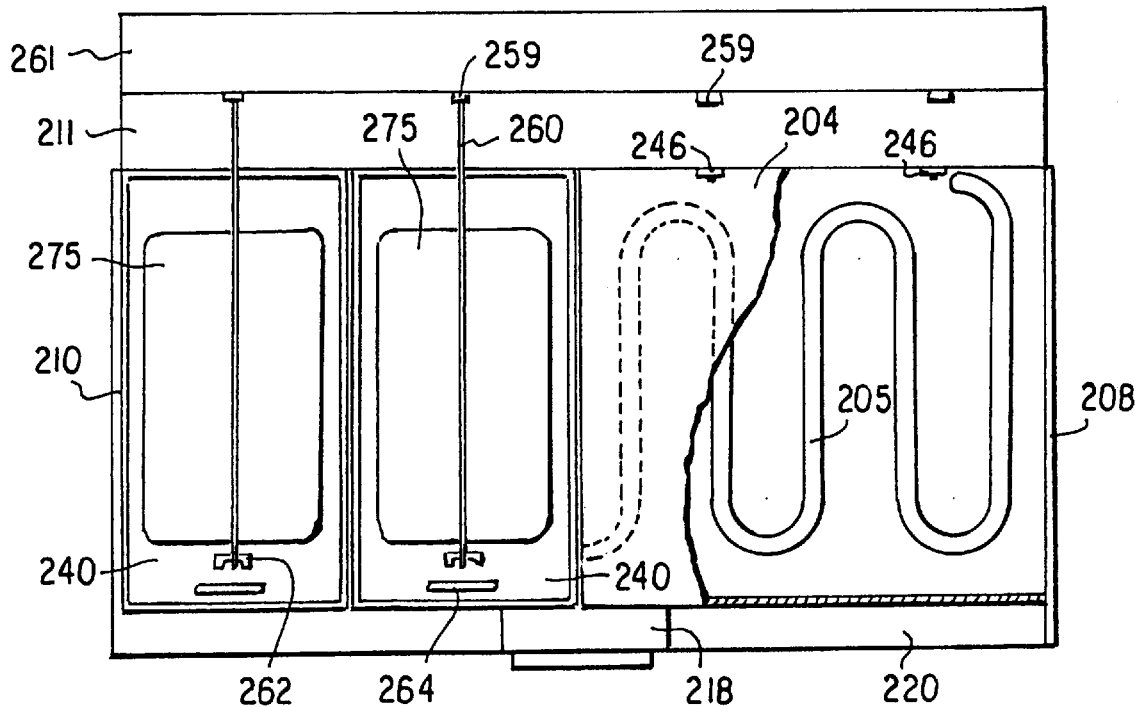
Figure 15:
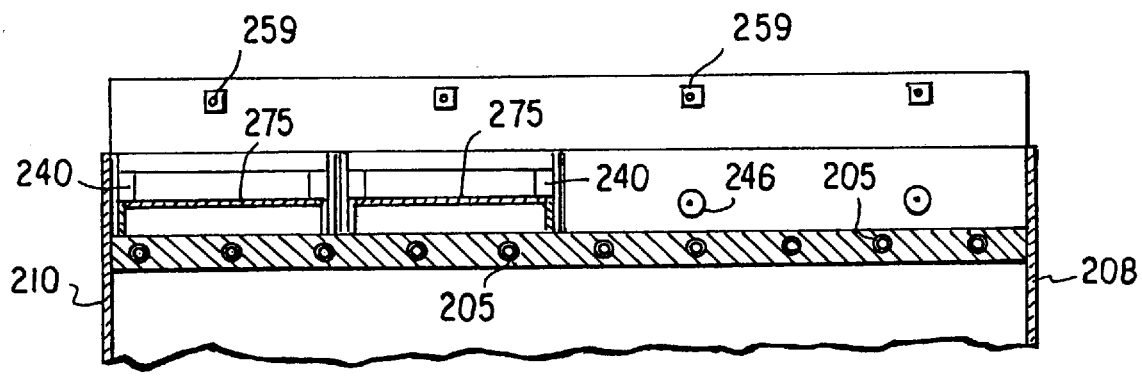
Figure 16:
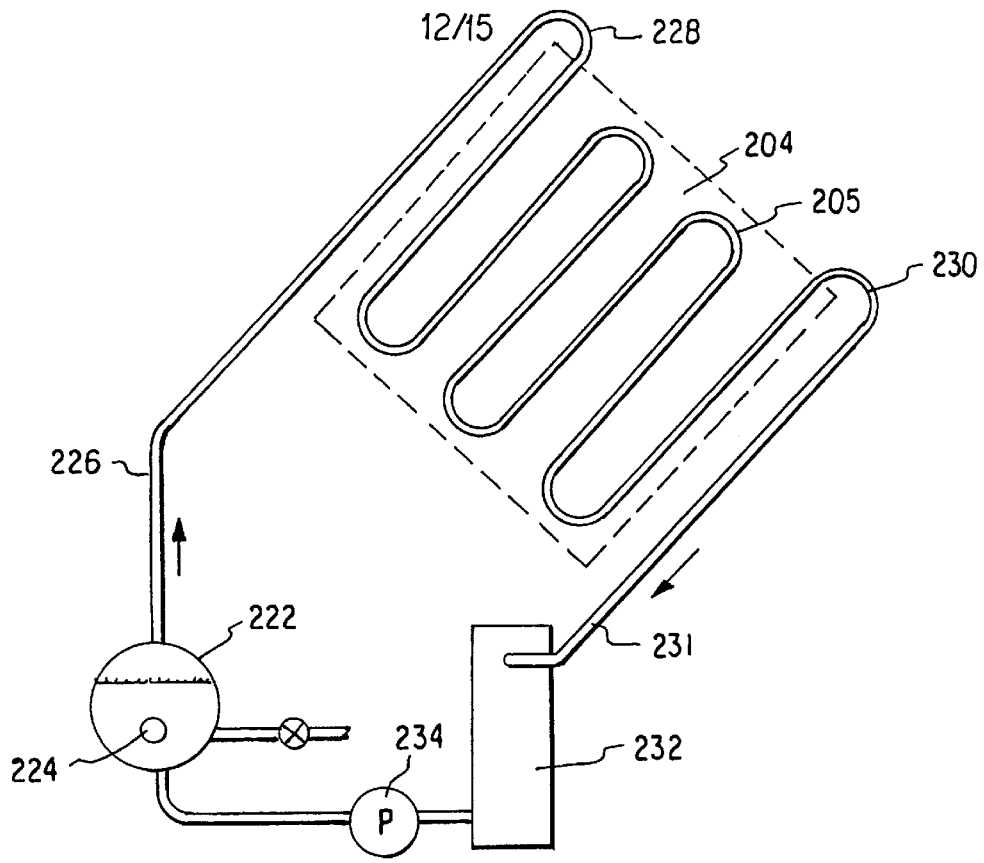
Figure 17:
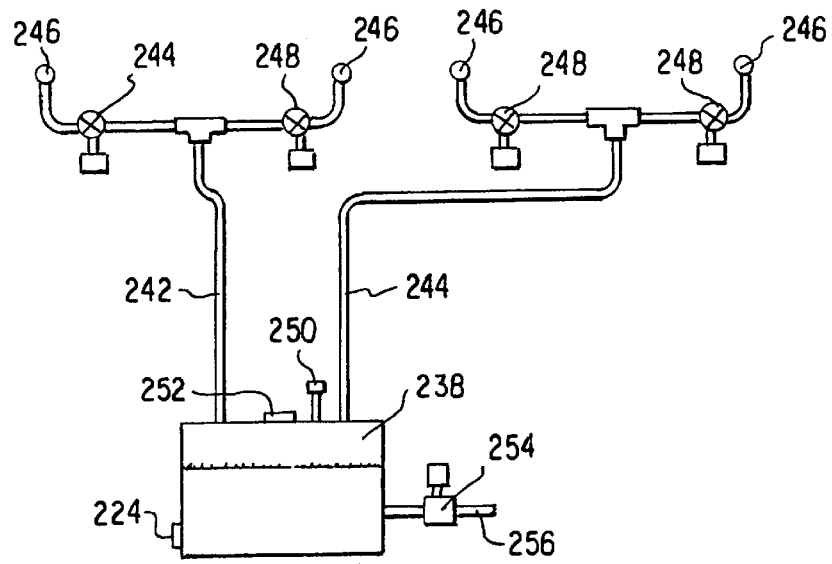
Figure 18:
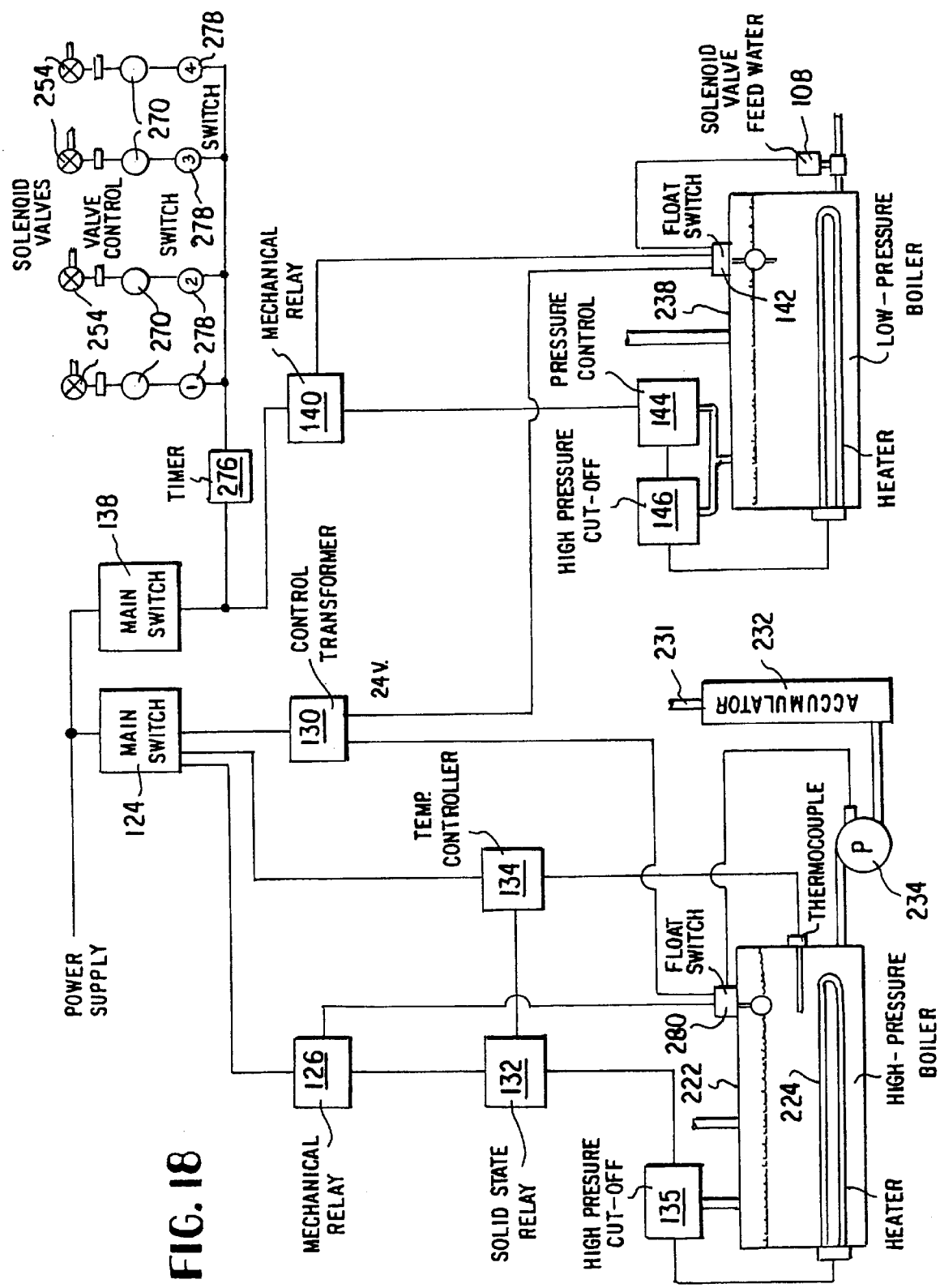
Figure 21:
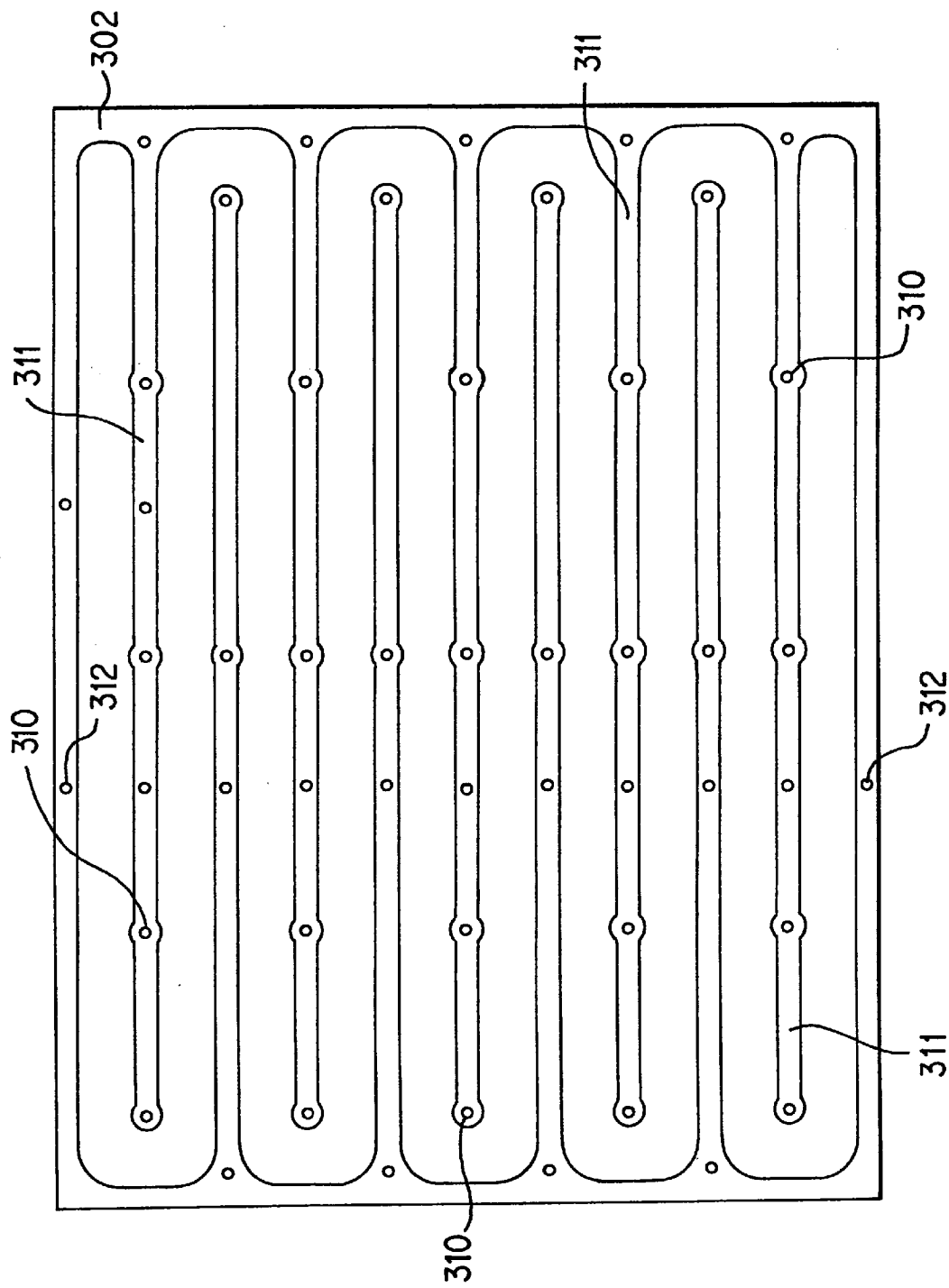

FIG. 8 is a pictorial representation of the low-pressure steam system used in the griddle/grill of the present invention;

FIG. 9 is a block diagram of a typical electrical control system of the present invention;

FIG. 10 is a front elevational view of another embodiment of a heated griddle of the present invention;

FIG. 11 is a cross-sectional view taken along the lines 11—11 of FIG. 10;

FIG. 12 is a cross-sectional view taken along the lines 12—12 of FIG. 10;

FIG. 13 is a cross-sectional view taken along the lines 13—13 of FIG. 11;

FIG. 14 is a plan view of the griddle, in part broken away;

FIG. 15 is a cross-sectional view taken along the lines 15—15 of FIG. 11;

FIG. 16 is a pictorial representation of the high-pressure steam system used in the griddle of the embodiment of FIG. 10;

FIG. 17 is a pictorial representation of the low-pressure steam system used in the griddle of the embodiment of FIG. 10;

FIG. 18 is a block diagram of another typical electrical control system of the present invention;

FIGS. 19 and 20 are side views and plan views, respectively, of another embodiment of a griddle assembly; and FIG. 21 is a plan view of a distribution plate of the embodiment of FIGS. 19 and 20.

DESCRIPTION OF PREFERRED EMBODIMENTS

Figure 1:
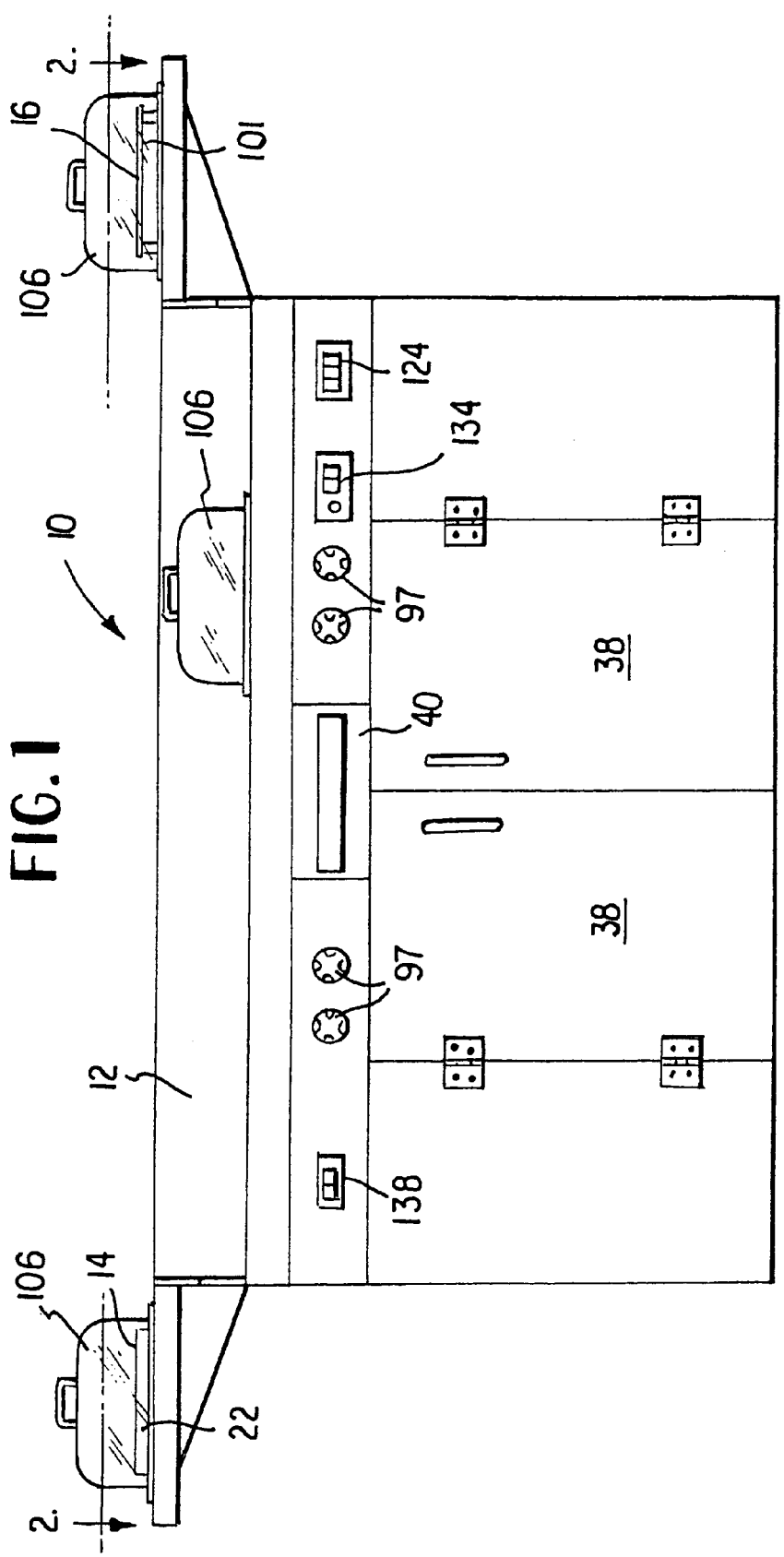
FIG. 1 is a front elevational view of the steam heated griddle and grill of the present invention.

Referring now to the drawings where like reference numerals indicate like elements in each of the several views, in FIG. 1 the cooking apparatus, generally 10, has a griddle section 12 and a grilling section 14.

Figure 2:
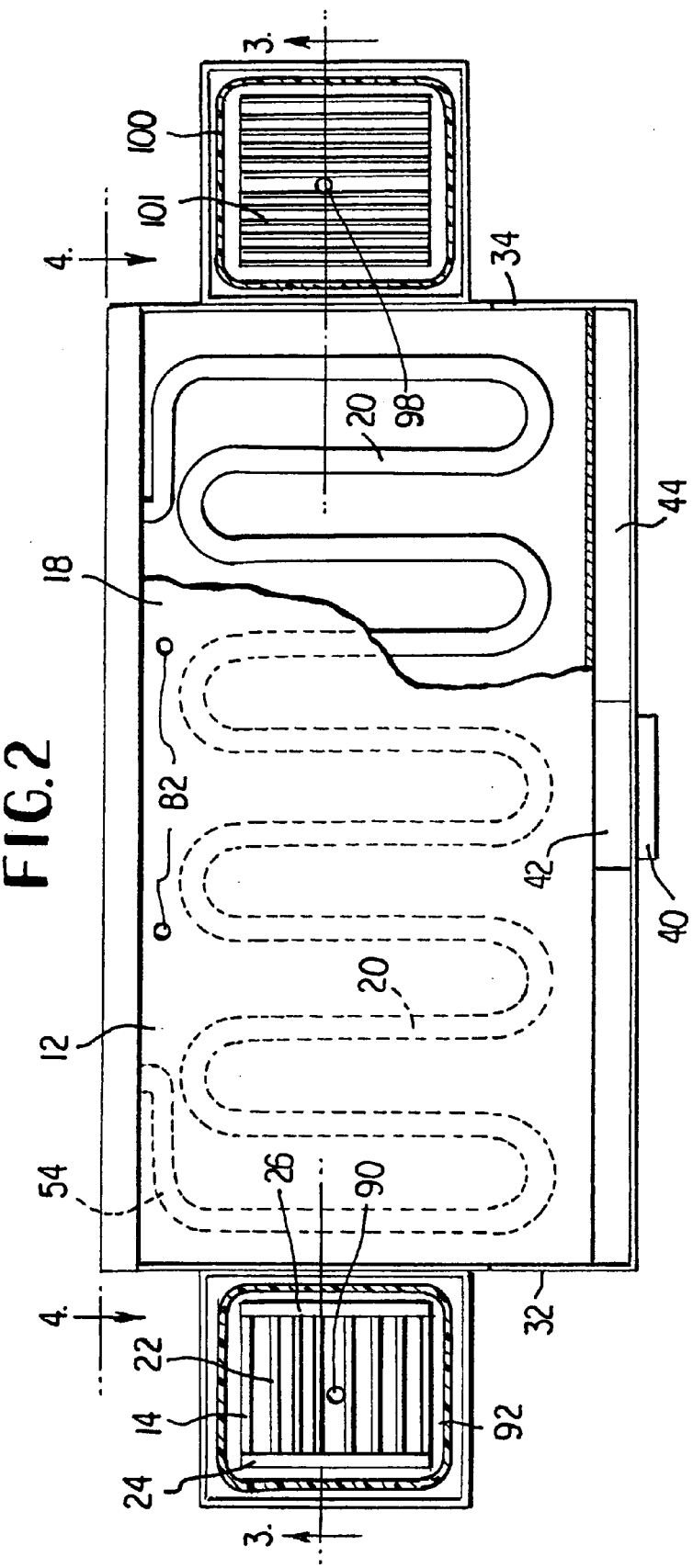
FIG. 2 is a plan view of the griddle/grill, in part broken away.
Figure 3:
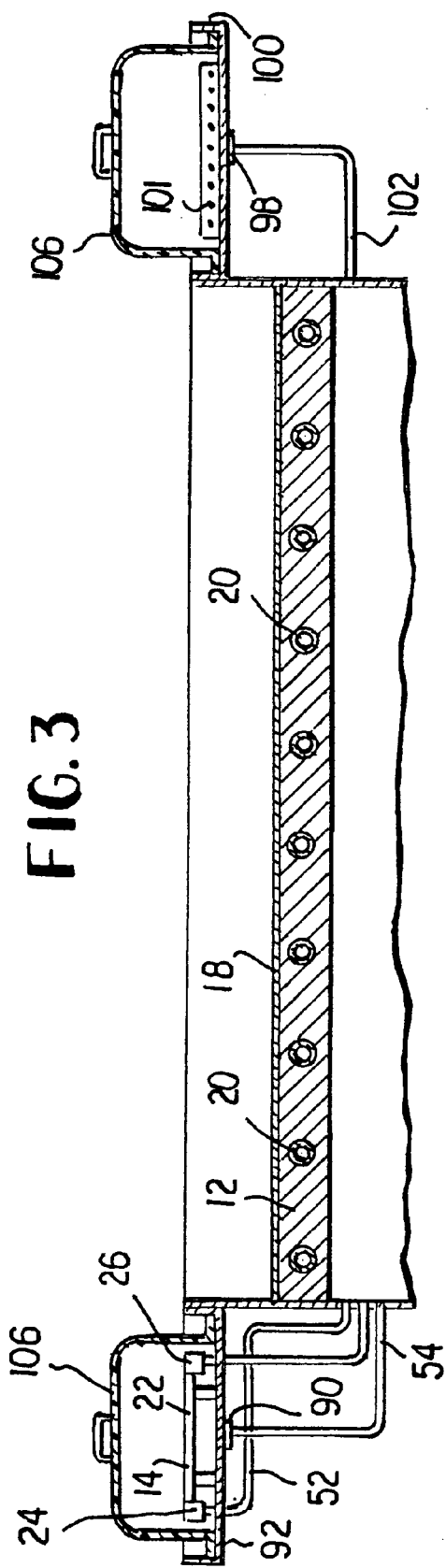
FIG. 3 is a cross-sectional view taken along lines 3—3 of FIG. 2.

The griddle section 12, shown also in FIGS. 2 and 3, comprises a cooking surface 18, e.g. a flat upper cooking surface, and a steam passageway 20. The passageway 20 may take a number of different forms, as explained below, but for an initial understanding of the invention, it will, in this first instance, be referred to as tubing passageway, e.g. tubing made of stainless steel or other metals as well. In one embodiment, the griddle 12 may be made by casting a metal, e.g. aluminum, about the tubing passageway 20 which results in extremely high heat conductivity between the outside surface of the tubing and the cast aluminum. Thus, heat from steam flowing in the tubing passageway 20 is transformed substantially in total to the cast griddle 12, by way of excellent conduction. The upper cooking surface 18 of the griddle 12 may be coated or has a layer of material thereon to provide a cooking surface 18 that is resistance to food sticking thereto during the cooking process, as described above.

The grilling section 14 is also provided, for example, adjacent to the griddle section 12 and comprises a plurality of spaced-apart grilling members 22. The grilling members 22 also have a steam passageway, described below, and in one illustrative embodiment for initial understanding of the invention, grilling members 22 are in the form of small diameter, e.g. ½ inch, tubular grilling members 22 having tubular ends thereof connected to and in communication with respective headers 24, 26. Thus, heat from steam entering header 24 passes through all the tubular grilling members 22 to heat the members 22 before exiting into header 26. The tubular grilling members 22 and header members 24, 26 may be also covered on the outside surfaces thereof with a stick resistant material, as described above, with respect to griddle upper cooking surface 18. The cooking apparatus 10 may also have a steamer section 16, described below.

Figures 5, 6:
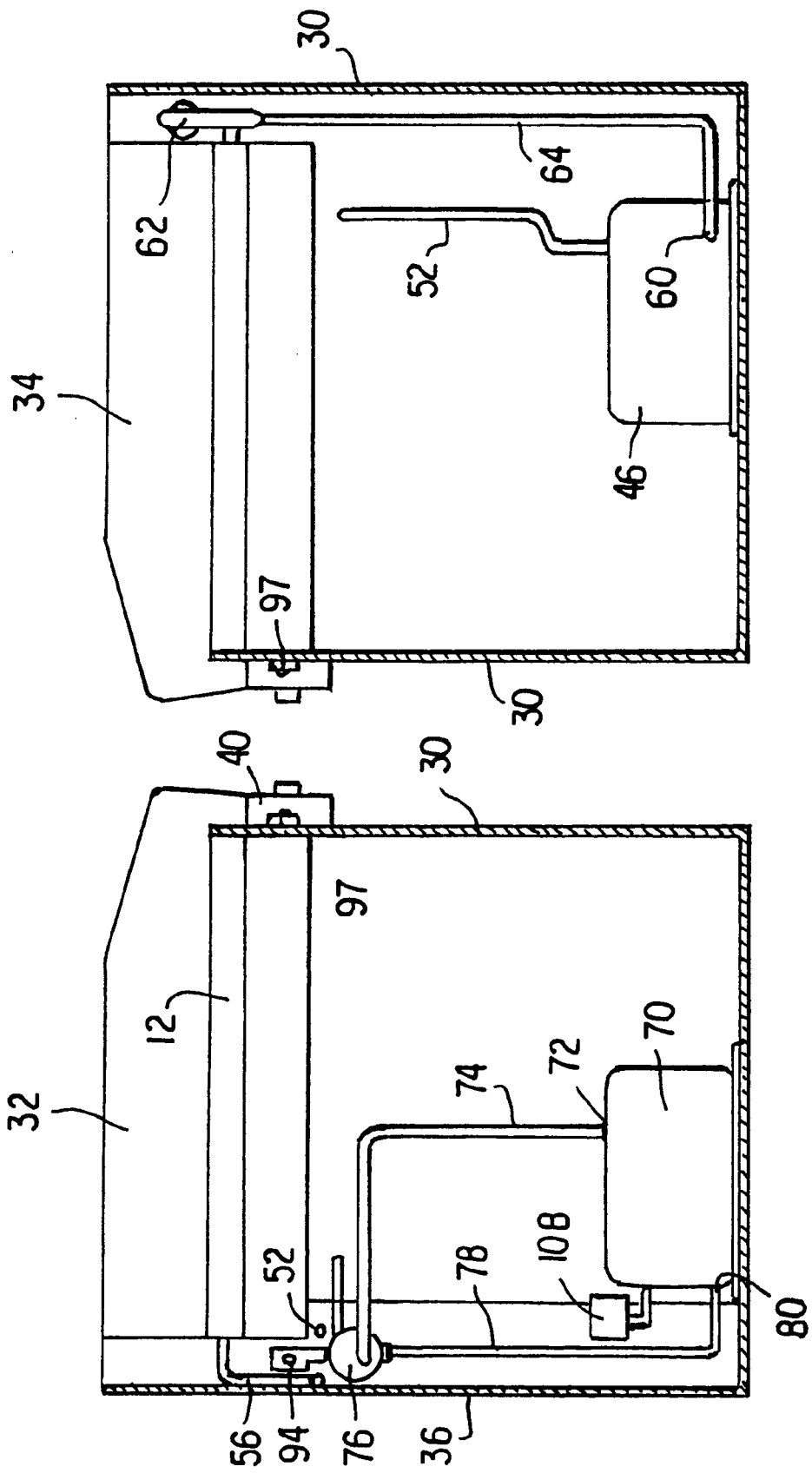
FIG. 5 is a cross-sectional view taken along the lines 5—5 of FIG. 4.
FIG. 6 is a cross-sectional view taken along the lines 6—6 of FIG. 4.
Figure 7:
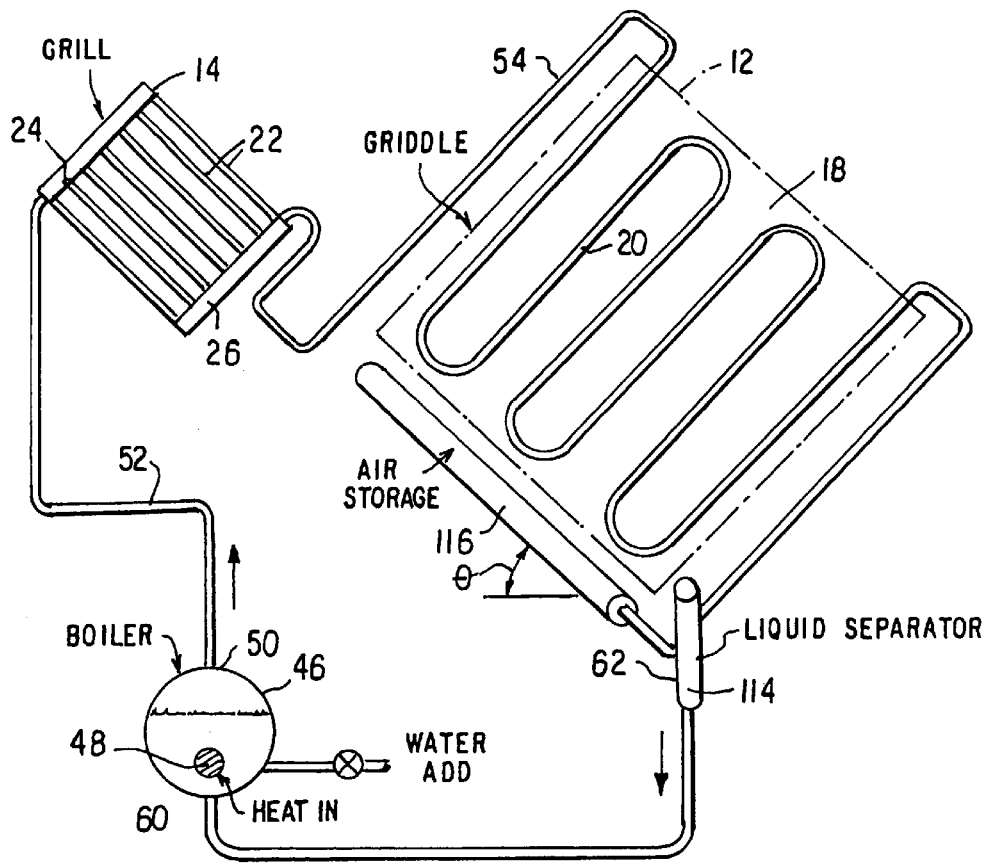
FIG. 7 is a pictorial representation of the high-pressure steam system used in the griddle/grill of the present invention.

The griddle, grilling and steamer sections 12, 14 and 16, respectively, are preferably mounted on a cabinet having a front wall 30 (see FIGS. 5 and 6), side walls 32, 34 (see FIG. 2) and a rear wall (see FIG. 5). The griddle section 12 is advantageously mounted between side walls 32, 34 and adjacent rear wall 36. The grilling section 14 is advantageously mounted on side wall 32, and the steamer section 16 is mounted on the side wall 34, or vice versa. The grilling section 14 and steamer section 16 could obviously be mounted elsewhere with respect to the griddle section 12, i.e. placed for convenience for the type of cooking being contemplated. Access doors 38 (see FIG. 1) to a storage bin beneath the griddle section 12 are also provided as is a removable bin 40 which serves to collect food product which may be scraped from the cooking surface 18 and deposited in the bin 40 via recess 42 (see FIG. 2) formed in a gutter 44 adjacent a front edge of the upper cooking surface 18.

Figure 4:
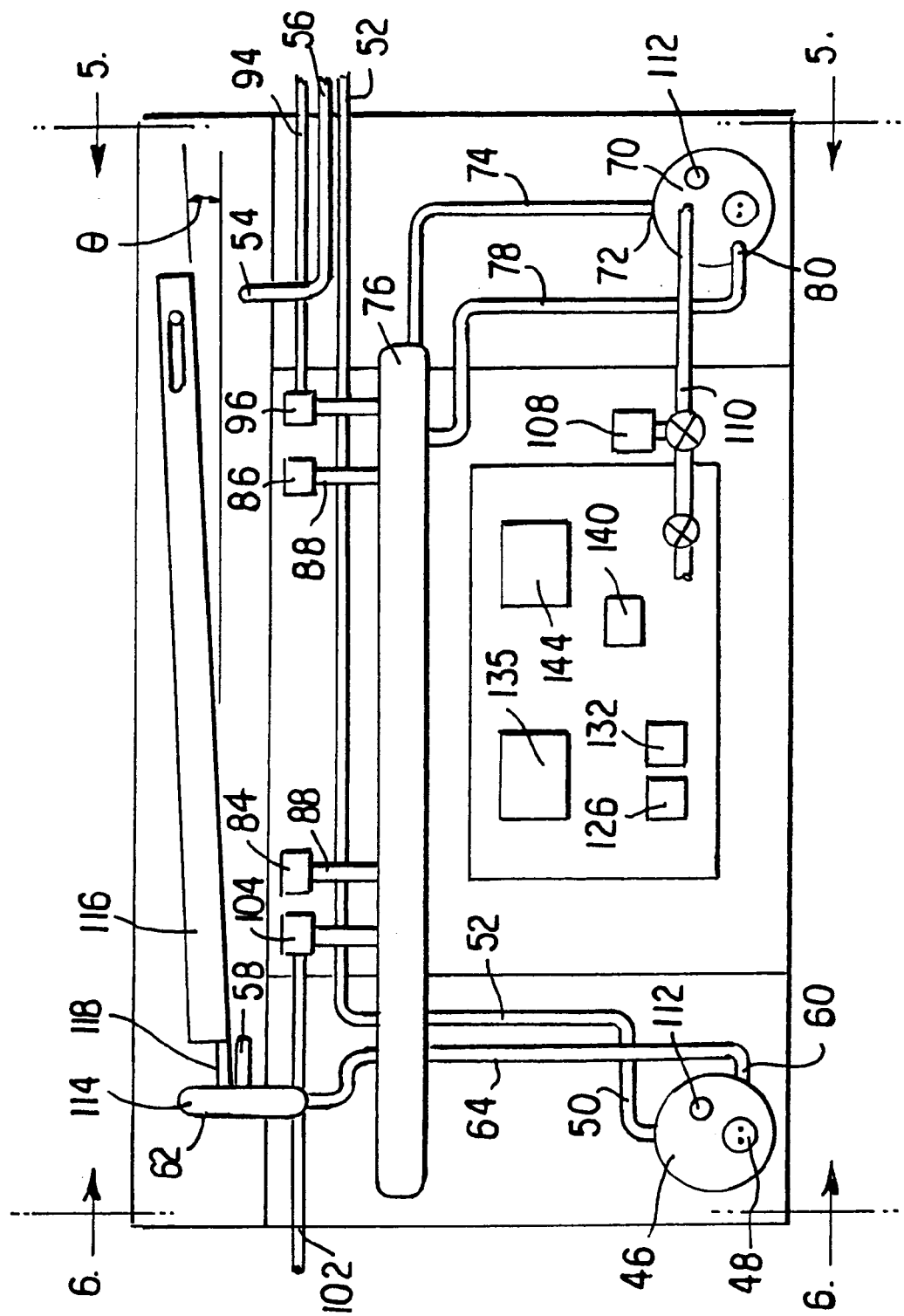
FIG. 4 is a rear elevational view of the griddle/grill.

The upper cooking surface 18 of the griddle section 12 and the grilling members 22 of the grilling section 14 are heated by high temperature steam flowing through steam passageways 20, header members 24, 26 and grilling members 22. The steam temperature can be controlled and held precisely at any pre-selected temperature by means more fully described later, for example, at between 350° F. to 360° F. and at a typical steam pressure of, for example, 150, e.g. 50–300, pounds per square inch. This high-pressure steam is generated in a steam generator, e.g. boiler 46, (see FIG. 4) heated by an electrical resistance heater 48. Gas or other heat source could also be used as long as it can be precisely controlled. The boiler 46 has an outlet 50 which is connected to heater 24 (see FIG. 2) by means of piping 52. The header 26 (see FIG. 2) is connected to the inlet 54 of passageway 20 of griddle section 12 by means of piping 56 and an outlet 58 of passageway 20 is connected to the boiler inlet 60 via liquid separator 62 (see FIG. 4). The function of the separator is described below. As can thus be seen, the steam from boiler 46 flows in a series path first through grilling section 14 and then through griddle section 12 and back to the boiler 46, or vice versa, or separately. As aforestated, it has been discovered that circulating steam at relatively high temperatures and pressures heats the griddle cooking surface 18 and results in a cooking surface that is, essentially, at the same temperature across its entire area, e.g. within one or two degrees Fahrenheit of its set point, in contrast to conventional gas-fired or electric griddles whose surface temperature can vary as much as 70° F. to 80° F. from one area to another.

The function of liquid separator 62 will now be described. After the boiler 46 is energized and resistance element of heater 48 heats the water converting it to steam and a pressure is achieved, preferably the steam first enters grilling section 14 and from there passes into and through griddle section 12 pushing any air in the system out to outlet 58. The serpentine configuration of passageway 20 in griddle section 12, rather, for example, than a header configuration employed in grilling section 14, enables air in passageway 20 to be completely pushed out to outlet 58 and precludes any air remaining in passageway 20 as could possibly be the case in grilling members 22. Any air remaining in passageway 20 could result in uneven heating of the cooking surface 18.

Air, steam condensate, and some steam exiting outlet 58 are fed to vertically extending tank 114. In tank 114, steam is separated from the condensate and the condensate returns to boiler 46. However, the air and steam mixture remaining in tank 114 is caused to travel into air storage tank 116 connected thereto via a pipe 118 where it is trapped. The steam condenses out in tank 116 and also returns to boiler 46. Air can enter the system through small leaks as there is a high vacuum created in the system when it is shut down and the steam in the shut down system condenses. This air must be kept from re-entering the system when it is once again started up. Thus, the trapped air remains in tank 116 and does not re-enter the system. The separator 62 and associated tanks 114 and 116 thus function to separate air from the system and enable the system to operate on only pure steam, even after repeated on and off cycling of the boiler 46. Thus, air does not repeatedly have to be purged from the system after each cycle (on-off). In addition, pipe 118 connecting tank 116 with tank 114 must be connected to tank 114 at a location and inclination to permit condensate forming in tank 114 to drain out of the tank and return to the boiler 46 via piping 64. Tank 116 is advantageously positioned at a slight angle e, e.g. 5–15°, with respect to the horizontal to facilitate this drainage of condensate therefrom.

In addition to the aforedescribed griddle and grilling sections 12, 14, respectively, wherein foods can be cooked by conduction heat when the foods come in direct contact with the heated cooking surface 18 and grilling members 22, the present cooking apparatus 10 includes a unique method and device for separately, but more preferably simultaneously, cooking the aforementioned foods by direct steam heating. Such steam heating is achieved by surrounding the foods being cooked on the cooking surface 18 or grilling members 22 with live, saturated steam injected beneath a cover 106 (see FIG. 1) placed over the cooking foods.

The live, saturated steam is generated by a second low pressure steam generator, e.g. boiler 70, (see FIG. 4) having an outlet 72 connected by piping 74 to a chamber 76, e.g. a length of larger diameter tubing, that serves as a separation chamber. The chamber 76 is also, preferably, mounted at a slight angle θ, as described above, with respect to the horizontal to permit any condensate formed therein to return to the boiler 70 via piping 78 and inlet 80. A plurality of steam vent holes 82 (see FIG. 2) are provided through the cooking surface 18 and connected via valves 84, 86 (see FIG. 4) to the separation chamber 76 by piping 88. In addition, a steam vent hole(s) 90 (see FIG. 2) is provided in a pan 92 beneath grilling members 22 of grilling section 14. The steam vent hole(s) 90 is connected to the separation chamber 76 by piping 94 (see FIG. 4) via valve 96. Further, a steam vent hole(s) 98 (see FIG. 3) is also provided in a pan 100 provided beneath a food support grid 101 (see FIG. 2) of steamer section 16. The vent hole(s) 98 is connected to the separation chamber 76 by piping 102 (see FIG. 3) via a valve 104 (see FIG. 4). Operation of the valves 84, 86, 96 and 104 by, for example, control knobs 97 can send saturated steam to vent holes 82, 90 and 98, respectively. The cover 106 (see FIG. 1), as aforementioned, is provided to be placed over the foods being simultaneously cooked by both steam from the steam vent holes and conduction from the heated griddle section 12 and grilling members 22. The cover 106 can take many forms, such as a glass dome enclosure or horizontally slidable or foldable glass panels. It is only necessary that cover 106 substantially contains the steam injected thereunder.

A float controlled solenoid valve 108 (see FIG. 4) is also provided in line 110 to replenish water in boiler 70 as it is converted into steam and discharged through the steam vent holes. Each boiler 46, 70 is equipped with a sight glass 112 (see FIG. 4) to enable the operator to visually determine the water level in the respective boilers.

While the electrical system for operating the apparatus can be as desired, FIG. 9 shows a typical block diagram of the various electrical components and their interconnection. As shown in FIG. 9, by way of example, power from a source of electrical current is fed to a first main switch 124 for controlling high-pressure boiler 46. Electrical current from main switch 124 is fed to a mechanical relay 126. This relay 126 is controlled by a float switch 128 which gets its electrical current from a control transformer 130. In the event that water in the boiler is so low as to possibly expose the boiler heater element 48, the float switch 128 shuts off the mechanical relay 126 and thus stops power going to the boiler heater element 48. The mechanical relay 126 feeds electrical current to a solid-state relay 132 which, in turn, is controlled by a temperature controller 134. Thus temperature controller gets its electrical current from the main switch 124 and senses the temperature in the boiler 46 by means of a sensing device, e.g. thermocouple, 136 inserted in the boiler water. The temperature controller 134 sends a pulsating proportional electrical signal to the solid state relay 132 to thereby control the temperature of the water in the boiler 46. Electrical current from the solid state relay 132 is fed to the heater element 48 via a high pressure cut-off switch 135 (see FIG. 4) to thereby terminate electrical current to the heater element 48 in the event pressure in boiler 46 exceeds a preset pressure.

The components and their interconnection for the low pressure boiler 70 may also be as desired, but a typical arrangement, by way of example, is also shown in FIG. 9 where a second main switch 138 is used for feeding electrical current from a source to a mechanical relay 140 which, in turn, is controlled by a float switch 142 in the same manner as the high pressure system aforementioned. The float switch 142, however, has two sets of contacts (not shown) for sensing different water levels in the boiler 70. The higher level contacts (not shown) control electrical current to a solenoid 108 to introduce feed water from a source into boiler 70 so as to replenish water lost in the form of steam vented through steam vent holes 82, 90, 98 and to maintain water at a certain level. The lower level contacts (not shown) control electric current to the mechanical relay 140 to thereby shut off power to the heater element 48 if the water level in the boiler should get too low. Electrical current from the mechanical relay 140 is fed first to a pressure control 144 which controls the pressure in the boiler 70 and then through a high pressure safety cut-off switch 146 which controls electrical current to the heater (similar to heater 48) in the event the pressure in boiler 70 gets too high.

Referring now to FIGS. 10 through 15 wherein another embodiment of the griddle 200 is shown, which comprises griddle section 202, preferably, having a flat solid upper non-stick coated cooking surface 204. Alternatively, instead of a flat, solid surface, the preferred embodiment, the surface could be grooved in a conventional manner to provide raised bars to cause "grill marks" on the cooked food or could be a discontinuous surface somewhat in the configuration of a conventional grill surface. The cooking surface 204 has a serpentine passageway 205 cast therein for transferring the steam. Similar to the aforementioned embodiments, as shown in FIGS. 10 through 12, the griddle section 202 is mounted on a cabinet member having a front wall 206, side walls 208, 210 and a rear wall 212. Access doors 214 are provided to a storage area as is a removable bin 216 which serves to collect food product which may be scraped from the cooking surface 204 and deposited in the bin 216 by way of a recess 218 (see FIG. 14) formed in a gutter 220 adjacent the front edge of the cooking surface 204.

The high-pressure steam for heating cooking surface 204 is generated in a steam generator, e.g. boiler 222, heated by an electrical resistance heater 224 as shown in FIG. 16. The boiler 22 has an outlet 226 (see FIG. 11) connected to the inlet 228 of passageway 205 (see FIG. 14). The outlet 230

(see FIG. 14) of passageway 205 is connected to an accumulator 232 (see FIG. 16) by piping 231. The accumulator 232 is an upstanding tank into which both steam and condensate flow from griddle section 202. Steam condensate settles to the bottom of the accumulator 232 and is removed and returned to boiler 222 by means of pump 234 or by gravity feed and return piping 236 (see FIG. 11), as will be more fully described later. Air present in the system flows into the accumulator 232 and is retained there and prevented from returning to the system.

In order to cook foods by convection heat simultaneously with cooking by conduction heat supplied to grilling section 202, the foods are surrounded by steam, preferably live, saturated low pressure steam, generated by a low pressure steam generator, e.g. boiler 238, (see FIG. 13) and injected beneath a cover 240 (see FIG. 11). The low pressure boiler 238, as shown in more detail in FIG. 17, has a plurality of outlet pipes 242, 244 which transfer steam generated in boiler 238 to outlet orifices 246 located in panel 211 (see FIG. 12) of rear wall 212 adjacent the cooking surface 204. The flow of steam to each outlet orifice 246 is controlled by valves 248, especially electrically operated solenoid type valves, as will also be more fully described below. The boiler 238 has a pressure relief valve 250 a well as a relief valve built into its fill cap 252. A float controlled solenoid valve 254 is also provided in line 256 to replenish water in boiler 238 as it is converted into steam and discharged through orifices 246.

The rectangular-shaped covers 240, as shown in FIG. 14, which, in their lowered position enclose the foods being cooked on cooking surface 202, are advantageously mounted for pivotal movement on pins 258 (see FIG. 12) located on panel 211. This mounting arrangement permits the cover 240 to be completely removed for cleaning, etc. In order to maintain the cover 240 in its raised position (see phantom lines in FIG. 11) for the placement or removal of foods relative to cooking surface 202, a cable 260 (see FIG. 12) is removably attached at one of its ends to a bracket 262 itself secured to the edge of cover 240 adjacent handle 264. The other end of the cable 260 extends through recess 259 (see FIG. 13) in longitudinal support 261 (see FIG. 12) and is secured to a closure mechanism 266 of the piston/cylinder type (see FIG. 13). The piston (not shown) is typically spring biased to cause retraction of the piston and its associated connecting rod. A switch 270 is mounted on the closure mechanism 266 and has its actuating member connected to an end of the connecting rod by means of a chain 274. The switch 270 functions to activate solenoid valve 254 (see FIG. 13) when the cover 240 is moved to its lower position to thereby cause steam from boiler 238 to enter beneath the cover 240 via orifices 246. The cover 240 has the primary function of containing the live, saturated steam in the area around the foods to cook them by convection heat as they are simultaneously being cooked by conduction heat from cooking surface 204. In addition, the cover 240 in its lowered position reduces heat passing into the room, thus making the room a more comfortable work environment. Further, since the temperature of the griddle section 202 is lower than the temperatures of conventional griddles, e.g. 350° F. to 390° F. versus 450° F. to 500° F., little smoke is involved with the present apparatus, especially when cover 240 is in place on the griddle. Thus, in some instances, the need for smoke evacuation devices is avoided. The cover 240 is typically provided with a glass window 275 (see FIG. 12) so that the cooking operation can be viewed. A mechanism (not shown) is also contemplated for locking the cover 240 in a lowered position for a predetermined time to prevent premature removal of the foods being cooked which could result in unhealthy, undercooked food. A variable timer 276 is provided to control the duration of time in which steam is permitted to enter beneath the cover 240 (approximately 2 minutes is quite useful) because it has been found that times of longer duration usually result in the wasting of steam. The timer 276 functions to interrupt energization of the solenoid valves 248 at the expiration of a preset time. Control of individual valves is controlled by switches 278.

While any desired electrical arrangement may be used, FIG. 18 shows a block diagram of the electrical components of griddle surface 202. Basically, the components and their function are the same as those described with respect to FIG. 9 with the following additional components. With respect to the system for controlling the high pressure steam boiler 222, a float switch 280 having an intermediate position is employed. When the water in the boiler reaches a preset level above the level at which the heater is exposed, the float switch 280 energizes pump 234 to thereby pump condensate from the accumulator 232 back to boiler 222 to thus maintain the desired water level in boiler 222. With respect to the system for controlling the low pressure steam boiler 238, a timer 276 is connected to the main switch 138. The timer 276 permits energization of solenoid valves 254 by switch 270 for a preselected duration when actuated by the closure of cover 240. The solenoid valves 254 are subject to energization by timer 276 and are controlled by individual on-off switches 278 as aforementioned.

Other features include a pressure gauge 282 to visually indicate the pressure in boiler 222, as well as a site glass 284 (see FIG. 10) to visually note the water level in boiler 222.

As noted above, griddle section 12 may take a variety of forms, but a preferred form is described below in connection with FIGS. 19, 20 and 21. FIG. 19 shows an upper plate 300, a lower plate 301 and a fluid distribution plate 302 sandwiched between upper and lower plates 300 and 301. The distribution plate 302 has a fluid passageway 303 (shown in dotted lines in FIG. 20) cut through distribution plate 302, e.g. by milling that plate or laser cutting that plate. Lower plate 301 has a steam inlet 304 and a steam outlet 305. Upper plate 300, lower plate 301 and distribution plate 302 are assembled into a united structure by any conventional means, e.g. screws, bolts, brazing and the like. Thus, in such assembly, the passageway 303, bounded by upper plate 300 and lower plate 301 creates a fluid-tight passageway 303 for the heating fluid, i.e. steam. Upper plate 300 may be surface treated with a non-stick coating, as described above, and in different surface configurations as described above. The steam connections for this embodiment are the same as described above in connection with other such embodiments.

Plates 300 and 301 and 302 may have, each, a thickness of between about 0.1 and 1.5 inches, but more usually about 0.2 to 1.0 inch, and the plates may be made of any desired metal, including steel, aluminum, bronze, etc.

This embodiment has the substantial advantage of being easier and less expensive to manufacture, as well as provide, for example, a steel cooking surface, i.e. upper plate 300.

In a preferred manner of producing the embodiment of FIGS. 19 and 20, a series of screw or bolt holes 310, see FIG. 21, are placed in distribution plate 302, and like holes are placed in lower plate 301, and for some embodiment in upper plate 300. After a conventional soldering/brazing material, e.g. copper brazing material, is placed at land areas 311, the three plates are bolted or screwed together with screws or bolts to provide a tightly and well-aligned assembly thereof. In addition, dowel holes and pins (not shown) may also be used between the plates for further alignment purposes.

After the assembly of the plates is achieved, the assembly is placed in a conventional brazing oven, operated at, for example, 1200° F. (or other temperature depending on the particular brazing material used), to braze the three plates together.

Also, preferably, as a safety measure, the brazed assembly is drilled from lower plate 301, through distribution plate 302, but not through upper plate 300, in land areas 311 to provide steam relief holes 312, one such relief hole shown in each land area 311, but two, three, four or more such relief holes 312 may be used in each land area 311. Thus, should a brazed land area fail and high pressure steam escape from passageway 303, that high pressure steam is passed through relief holes 312 and into the cabinet (see FIG. 1) and away from a person who may be operating the griddle. This provides an important safety advantage.

The cover 106, 240 can, of course, take many forms. It is only necessary that the cover sufficiently enclose foods being cooked on a heated surface (by conduction) that the live steam injected under the cover be substantially contained within the cover so as to produce cooking of the food, also, by convection and condensation. Indeed, the beneficial affect of the cooking by this convection and condensation of live steam is such that usual cooking times for a particular griddle and grill, or of a conventional nature, can easily be reduced by onehalf. In addition, the foods, for example, hamburgers, steaks and chops, substantially retain a juicy and flavorful taste, as opposed to foods cooked in a conventional griddle or grill without that cover and steam injection.

Thus, the present cover and steam generating mechanisms, described above, can, for example, be used on conventional electrical and gas or oil heated grills. Such use will substantially reduce the usual cooking time of the food on such conventional grill and, in addition, substantially increase the juiciness and flavor of the cooked foods.

Applicants have thus disclosed and described in detail their novel steam heated griddle and grill which can simultaneously cook food items by introducing steam into the interior of a cover for food items placed on the griddle and grill.

It should be understood that changes and modifications in the form, construction, arrangement, and combination of the several parts of the heated griddle and grill may be made and substituted for those herein shown and described without departing from the nature and principle of our invention.

What is claimed is:

1. An apparatus for cooking foods comprising:
   a) a conduction heated griddle having an upper food support surface for supporting foods to be cooked thereon;
   b) a steam generator for supplying steam at controlled temperatures;
   c) at least one cover disposable adjacent to the support surface and adapted to be placed at or removed from a position substantially covering the foods; and
   d) an orifice connected to the steam generator for supplying steam to an inside of the cover and around the foods so as to aid in the cooking of the foods simultaneously with the foods being cooked by the heated griddle.

2. An apparatus as set forth in claim 1, wherein said cover is mounted in a movable relation to the support surface.

3. An apparatus as set forth in claim 2, further comprising closer means operatably connected to the cover for maintaining the cover in a raised position.

4. An apparatus as set forth in claim 3, wherein said closure means is connected to said cover by means of a cable.

5. An apparatus as set forth in claim 3, further comprising at least one valve for controlling a flow of steam from the steam generator to the orifice in response to movement of the cover from the raised position to a closed position.

6. An apparatus as set forth in claim 5, wherein said valve is solenoid actuated and electric current to the solenoid is controlled by a switch operatably connected to the cover.

7. An apparatus as set forth in claim 1, wherein the cover is at least partially transparent so the cooking foods can be observed.

8. An apparatus as set forth in claim 1, further comprising a vertically upstanding wall member adjacent the support surface and the orifice is located in the wall member.

9. An apparatus as set forth in claim 8, further comprising at least one spaced-apart projection supported by the wall member, said projection providing a pivot point for the cover to be moved from a raised position to a lowered position.

10. An apparatus for cooking foods comprising:
    a) a steam generator for supplying steam at controlled temperatures;
    b) a conduction heated griddle having an upper plate, a lower plate and a distribution plate disposed between the upper plate and the lower plate, the distribution plate having a steam passageway therethrough;
    c) a steam inlet and a steam outlet in the lower plate connecting with the passageway;
    d) a conduit connecting the steam generator and the steam inlet for supplying steam to the passageway.

11. The apparatus of claim 10, wherein the plates are soldered or brazed together at land areas of the distribution plate.

12. The apparatus of claim 11, wherein the plates are tightly assembled prior to brazing.

13. The apparatus of claim 12, wherein the tight assembly is provided by bolts or screws.

14. The apparatus of claim 10, wherein the upper plate has a non-stick coating thereon.

15. The apparatus of claim 10, wherein a hole passes through the lower plate and through the distribution plate in land areas of the distribution plate to provide high pressure steam relief in the event of a failure of a joint between sections of the passageway.

* * * * *